Dec. 27, 1955
C. A. HOFF
2,728,284
AIR INTAKE FOR MOTOR BUSSES AND LIKE VEHICLES
Filed Feb. 2, 1952
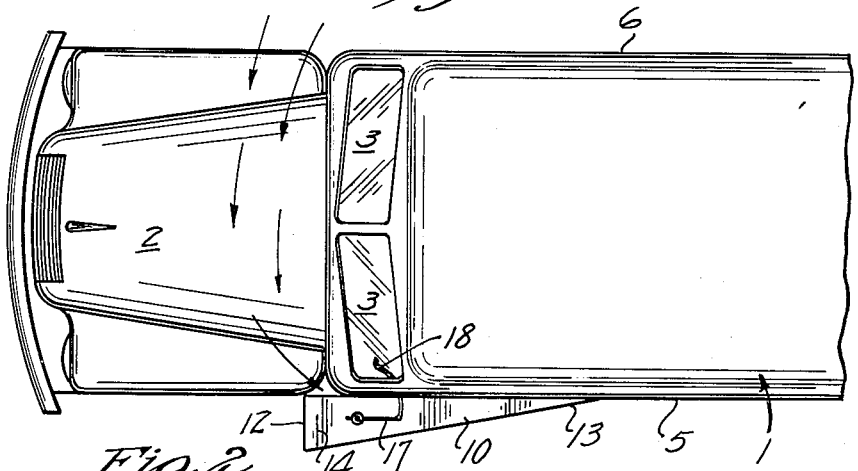
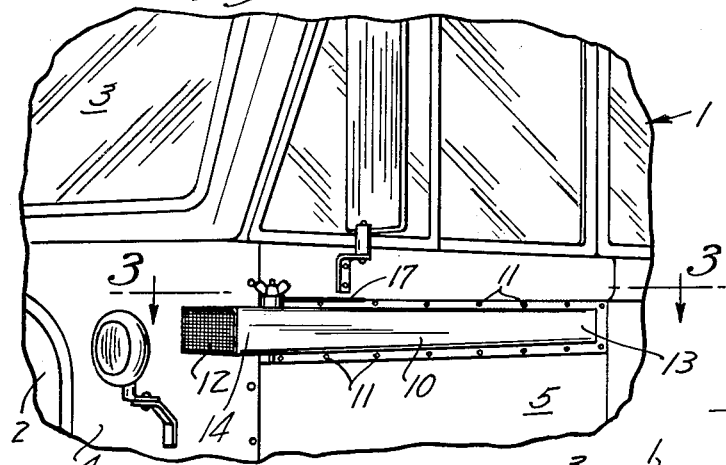
INVENTOR.
Clarence A. Hoff
BY
Merchant & Merchant
ATTORNEYS

United States Patent Office 2,728,284
Patented Dec. 27, 1955

2,728,284
AIR INTAKE FOR MOTOR BUSSES AND LIKE VEHICLES

Clarence A. Hoff, Milan, Minn.

Application February 2, 1952, Serial No. 269,653

1 Claim. (Cl. 98—2)

My invention relates to improvements in automotive vehicles, and more particularly to improvements in the heating means of bus bodies.

The conventional bus is provided in its interior with a heat exchange unit which derives its air through an opening in the body communicating with the outside. These openings are closely adjacent to the driver's seat on the left hand side of the body. Under certain wind conditions, such an arrangement is effective to adequately heat the interior of the bus. However, under other wind conditions, this arrangement is totally inadequate. For instance, when the winds are blowing so that the air is being forced into the opening of the body and thus through the heater, satisfactory heat is imparted to the bus. However, when the bus is bucking a cross-wind, and particularly when the cross-wind is one which also is blowing in the general direction in which the bus is moving, then and in that event certain eddy currents are set up, or a partial vacuum created on the left side of the bus body, which effectively cause a reverse action through the heat exchange unit, thus sucking warm air out of the bus.

The primary object of my invention is the provision of means for overcoming the unfavorable situation immediately above described, and to produce means whereby the conventional heater will operate uniformly and satisfactorily under all wind conditions.

A still further object of my invention is the provision of a highly efficient adjustable means for the accomplishment of the objects above set forth.

A still further object of my invention is the provision of an inexpensive but durable arrangement of parts for the accomplishment of the above objects.

The above and still further objects of my invention will become apparent from the following detailed specification, appended claim and attached drawings.

Referring to the drawings, wherein like characters indicate like parts throughout the several views:

Fig. 1 is a plan view of a conventional bus body showing my invention secured thereto, some parts being broken away;

Fig. 2 is an enlarged fragmentary view of the structure of Fig. 1 showing the exterior of my novel structure;

Fig. 3 is an enlarged fragmentary view taken substantially on the line 3—3 of Fig. 2, some parts being broken away; and Fig. 4 is an enlarged sectional view taken substantially on the line 4—4 of Fig. 3.

Referring with greater particularity to the drawings, the numeral 1 indicates in its entirety a bus body, a hood 2 projecting forwardly therefrom. The body 1, includes a wind shield 3 in a front wall 4, a left hand side wall 5, and right hand side wall 6.

Secured to the inner surface 7 of the side wall 5 closely adjacent the driver's seat, is a heat exchange unit 8, preferably of the multi-tube radiator type which is heated by hot water forced through said tubes from the motor, none of which elements have any part in this invention and hence are not shown. The wall 5 is provided with a transverse duct-like opening 9 therethrough which leads to the heat exchange unit 8. Conventionally, the heat exchange unit 8 is equipped with an electrical motor-driven fan, not shown, which sucks air therethrough from the outside by way of opening 9. However, under the conditions above described, wherein the cross-winds create a partial vacuum adjacent the side wall 5 of the bus, even the fan is incapable of sucking air through the opening 9 and the heat exchange unit 8. To overcome this condition, I provide an elongated generally horizontal boot 10, which is secured to the outer surface of the wall 5 by means of rivets or the like 11, and which, preferably and as shown, tapers rearwardly in width from the open front end 12 to its rear end 13. As shown, the toe or forward end portion 14 of the boot 10 projects forwardly of the front wall 4 of the bus body 1, whereas the heel or rear portion 13 thereof communicates with the transverse opening 9 through the wall 5. It is important to note that the side 15 of the boot 10 adjacent the body, and forwardly therefrom, is open, whereby to provide a scoop for air moving laterally across the vertical body 1 in the direction of the boot 10 from the opposite side 6. Also, preferably and as shown, open end 12 and open side 15 are screened to keep out bugs and the like.

Mounted for pivotal movements on a vertical plane, within the boot 10, intermediate the open front end portions 12 and 15, is a gate-like valve element 16, which is provided with a generally L-shaped handle 17, the free end 18 of which projects into the interior of the bus adjacent the driver. Manipulation of the handle causes rotation of the valve element 16, whereby to permit passage of the desired amount of air through the boot 10, the passage 9 and the heat exchange unit 8.

With the above described apparatus, a desired amount of air may be caused to flow through the heat exchange unit 8 to heat the interior body 1, under any conditions. Even when the wind is blowing in the direction of the arrows shown in Fig. 1, air will be caused to pass transversely across the front wall 4 from the side 6 toward the side 5 of the body 1. These transverse currents, also indicated by the arrow, will be caused to enter the boot 10 through the scoop-acting open side 15.

My invention has been thoroughly tested and found to be completely satisfactory for the accomplishment of the above objects, and while I have shown and described a commercial embodiment of my invention, it should be obvious that same is capable of modification without departure from the scope of the appended claim.

What I claim is:

In an automotive vehicle including a generally rectangular body having a heat exchange unit connected to an inner wall thereof and an opening through said wall defining an air passage communicating with said heat exchange unit and the exterior of the vehicle, the combination of a generally horizontal elongated boot secured to the outer wall surface of the body in overlying relationship to said opening, the toe of said boot projecting forwardly of the adjacent front wall portion of said body and the heel portion thereof communicating with said opening and providing an extension to the air passage formed thereby, the toe end portion of said boot defining an inlet opening extending across the front end thereof and longitudinally rearwardly therefrom only at the side thereof adjacent said body, the front end portion of the boot providing a scoop for air currents moving laterally across said vehicle body in the direction of said boot from the opposite side of said body as well as for currents moving relatively rearwardly with respect to the vehicle.

References Cited in the file of this patent

UNITED STATES PATENTS

| | | |
|---|---|---|
| 545,794 | Griffith | Sept. 3, 1895 |
| 1,395,383 | Bogart | Nov. 1, 1921 |
| 2,152,388 | Will | Mar. 29, 1939 |
| 2,223,884 | Bolan | Dec. 3, 1940 |
| 2,232,108 | Giacomini | Feb. 18, 1941 |
| 2,516,103 | Brown | July 25, 1950 |